United States Patent [19]
Wu

[11] Patent Number: 5,970,971
[45] Date of Patent: Oct. 26, 1999

[54] FOLDABLE BARBECUE DEVICE

[76] Inventor: Ming Chuan Wu, No. 62-16, Tong Wan Li, Tong Shiau Town, Miauli Hsien, Taiwan

[21] Appl. No.: 09/174,880

[22] Filed: Oct. 19, 1998

[51] Int. Cl.[6] .................................................... F24C 5/20
[52] U.S. Cl. ........................ 126/38; 126/25 R; 126/41 R
[58] Field of Search ............................... 126/41 R, 25 R, 126/38

[56] References Cited

U.S. PATENT DOCUMENTS 2,728,335  12/1955  Garrett et al. ............................. 126/38

*Primary Examiner*—Carroll B. Dority

[57] ABSTRACT

A barbecue device includes a housing and two covers pivotally secured to the side portions of the housing. The covers each includes a leg for enclosing the side portions of the housing when the covers are folded to the folded position, and for elevating the housing when the covers are rotated to the open position. A gas stove may be received in the housing, and a gas bottle may be secured to one of the covers for supplying the gas to the stove. A protective cap is supported on the stove and includes an upwardly curved structure having a number of side facing openings.

7 Claims, 6 Drawing Sheets

FOLDABLE BARBECUE DEVICE

BACKGROUND OF THE INVENTION

1. Field of the Invention

The present invention relates to a barbecue device, and more particularly to a foldable barbecue device.

2. Description of the Prior Art

Typical barbecue devices comprise a solid structure that may not be folded for storing purposes. In addition, the legs of the barbecue devices are separated from the barbecue devices and may not be easily assembled to the working position.

The present invention has arisen to mitigate and/or obviate the afore-described disadvantages of the conventional barbecue devices.

SUMMARY OF THE INVENTION

The primary objective of the present invention is to provide a barbecue device having a foldable structure and having a pair of legs that may be easily opened to the working position.

In accordance with one aspect of the invention, there is provided a barbecue device comprising a housing including two side portions and including a chamber formed therein, and a pair of covers each pivotally secured to the side portion of the housing at a pivot shaft for allowing the covers to be folded between a folded position and an open position. The covers each includes a leg for enclosing the side portions of the housing when the covers are folded to the folded position, the legs of the covers are folded and dependent downward from the housing for elevating the housing when the covers are rotated to the open position, the covers each includes a base for supporting the legs at the open position. The covers may be easily folded to the open position.

One of the covers includes at least one retainer, and the housing includes a bottle secured to the at least one retainer. The bottle is a gas bottle or may be bottle for receiving seasonings.

The housing includes a front panel and a rear panel and includes at least three brackets secured to the front panel and the rear panel, the barbecue device further includes a grill having at least three extensions extended downward for engaging with the at least three brackets and for secured to the housing.

The housing includes a chamber for receiving a stove. A protective cap is further supported on top of the stove and includes an upwardly curved structure having a plurality of bulges formed thereon for defining a plurality of openings.

Further objectives and advantages of the present invention will become apparent from a careful reading of a detailed description provided hereinbelow, with appropriate reference to accompanying drawings.

DETAILED DESCRIPTION OF THE PREFERRED EMBODIMENT

Figure 1:
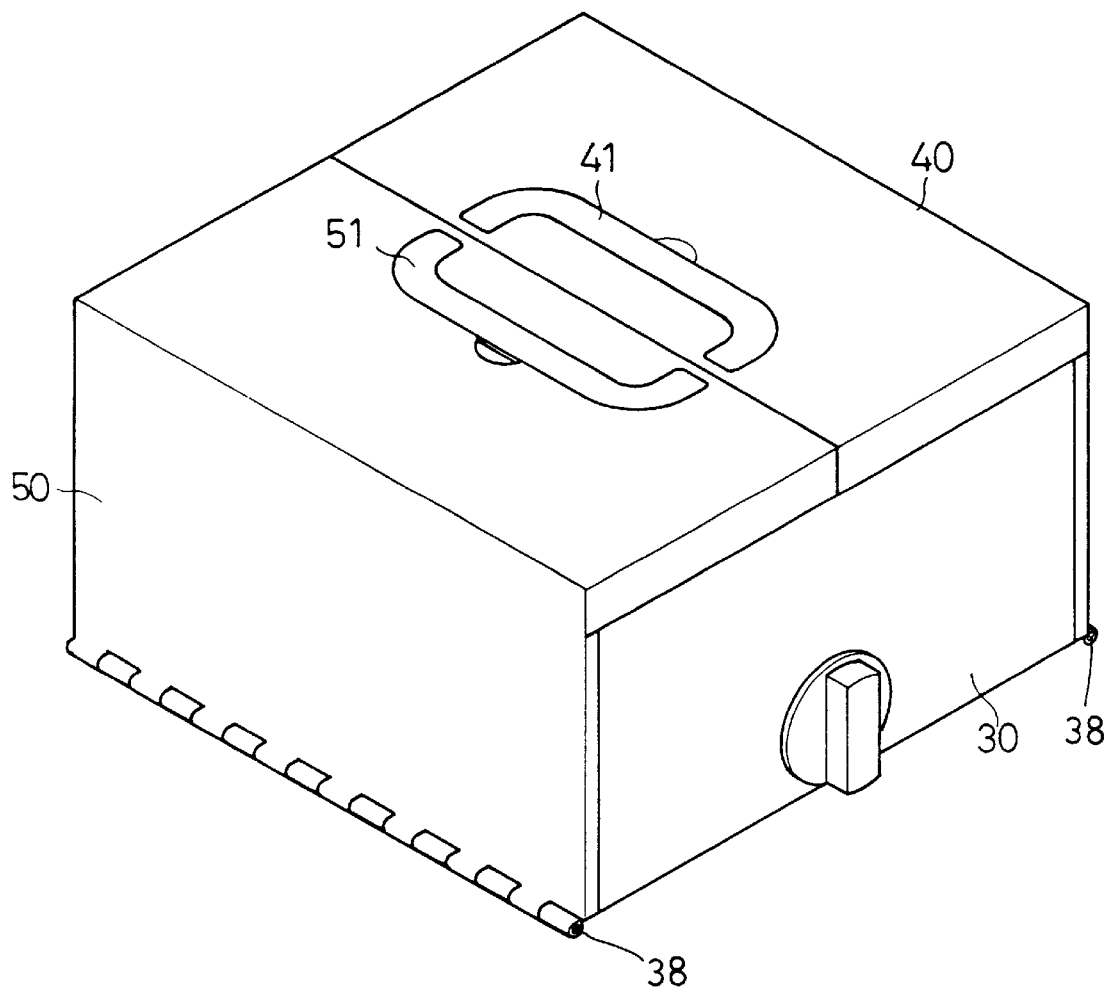
FIG. 1 is a perspective view of a barbecue device in accordance with the present invention, which is in the folded structure.
Figure 2:
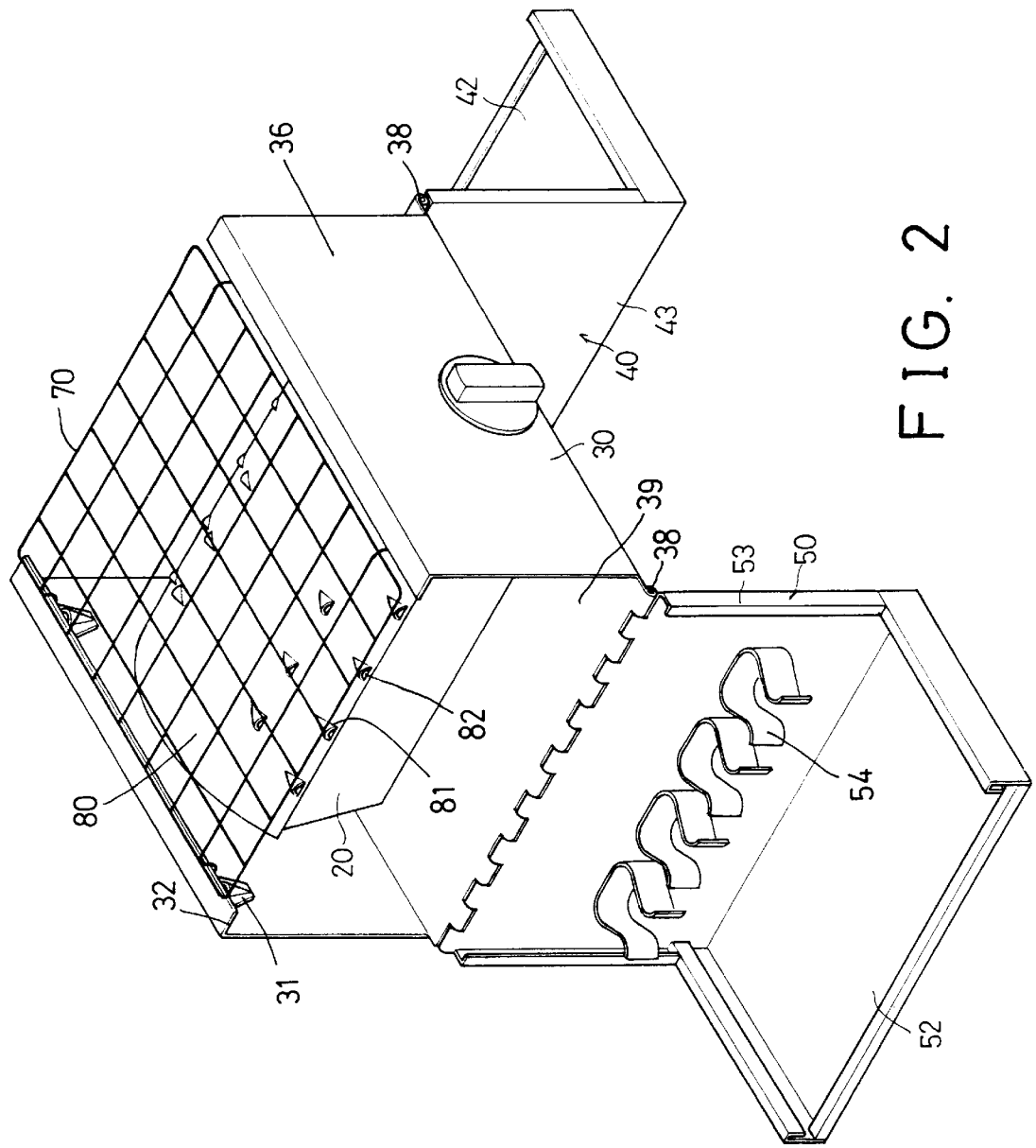
FIG. 2 is a front perspective view of the barbecue device which is in the open and working position.
Figure 3:
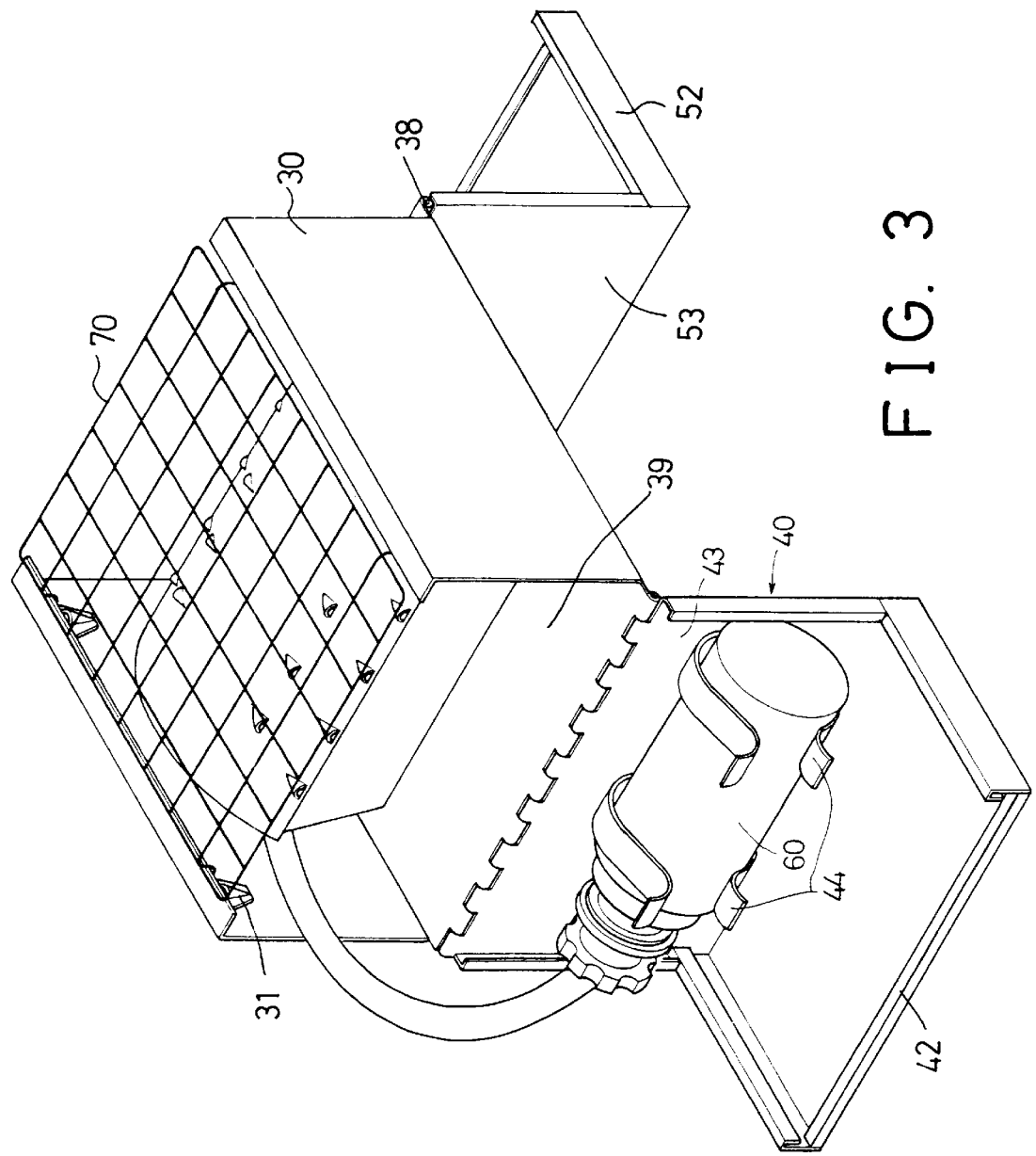
FIG. 3 is a rear perspective view of the barbecue device which is in the open and working position.
Figure 4:
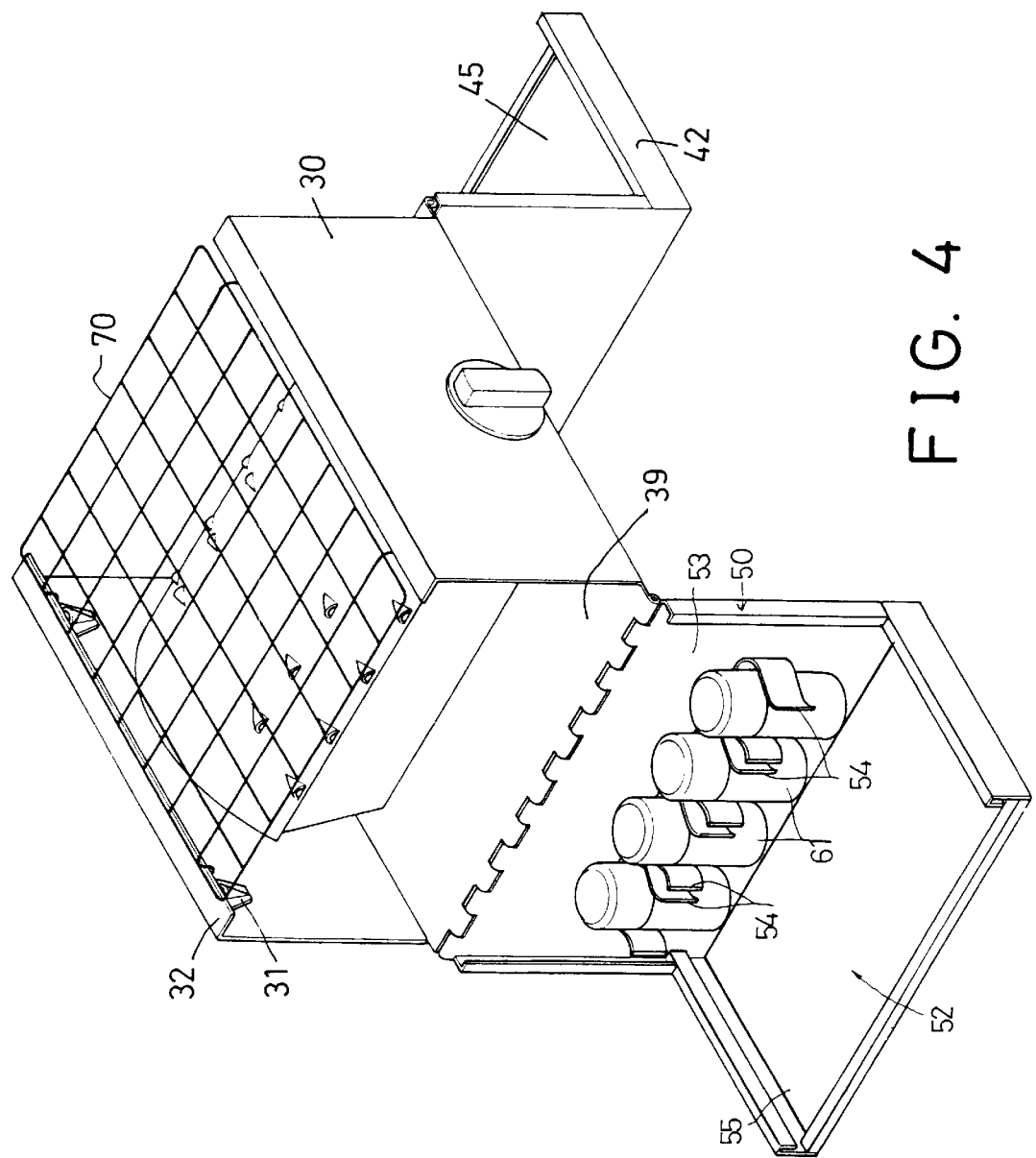
FIG. 4 is a front perspective view similar to FIG. 2, illustrating the operation of the barbecue device.

Referring to the drawings, and initially to FIGS. 1–3, a barbecue device in accordance with the present invention comprises a housing 30 includes two side portions and includes two L-shaped covers 40, 50 pivotally coupled to the two side portions of the housing 30 at the hinges or at the pivot shafts 38 for allowing the covers 40, 50 to be folded to engage on the housing 30 at the folded position (FIG. 1) or opened to the open position (FIGS. 2–4). The covers 40, 50 each includes a leg 43, 53 for covering the side portions of the housing 30 when the covers 40, 50 are folded to the folded position, and for elevating the housing 30 when the legs 43, 53 are dependent downward from the housing 30 (FIGS. 2–4) and each includes a base 42, 52 for stably supporting the legs 43, 53 and the housing 30 at the elevated position or at the open or working position. The bases 42, 52 of the covers 40, 50 each includes a recess 45, 55 for receiving the forks, spoons, sticks, or chopsticks etc. The cover 40, 50 each includes a hand grip 41, 51 (FIG. 1) for carrying the barbecue device.

The housing 30 includes a chamber 39 formed therein for receiving a gas stove 20 and includes a pair of flanges 32 extended inward of the chamber 39 from the upper front and the upper rear portion of the housing 30. The cover 40 may include one or more retainers 44 secured to the leg 43 (FIG. 3) for holding a gas bottle 60 which is coupled to the stove 20 for supplying the gas to the stove 20. The cover 50 includes one or more retainers 54 for supporting the other bottles 61 for seasonings, such as the pepper, salt, sugar, soy sauce, etc. (FIG. 4).

Figure 5:
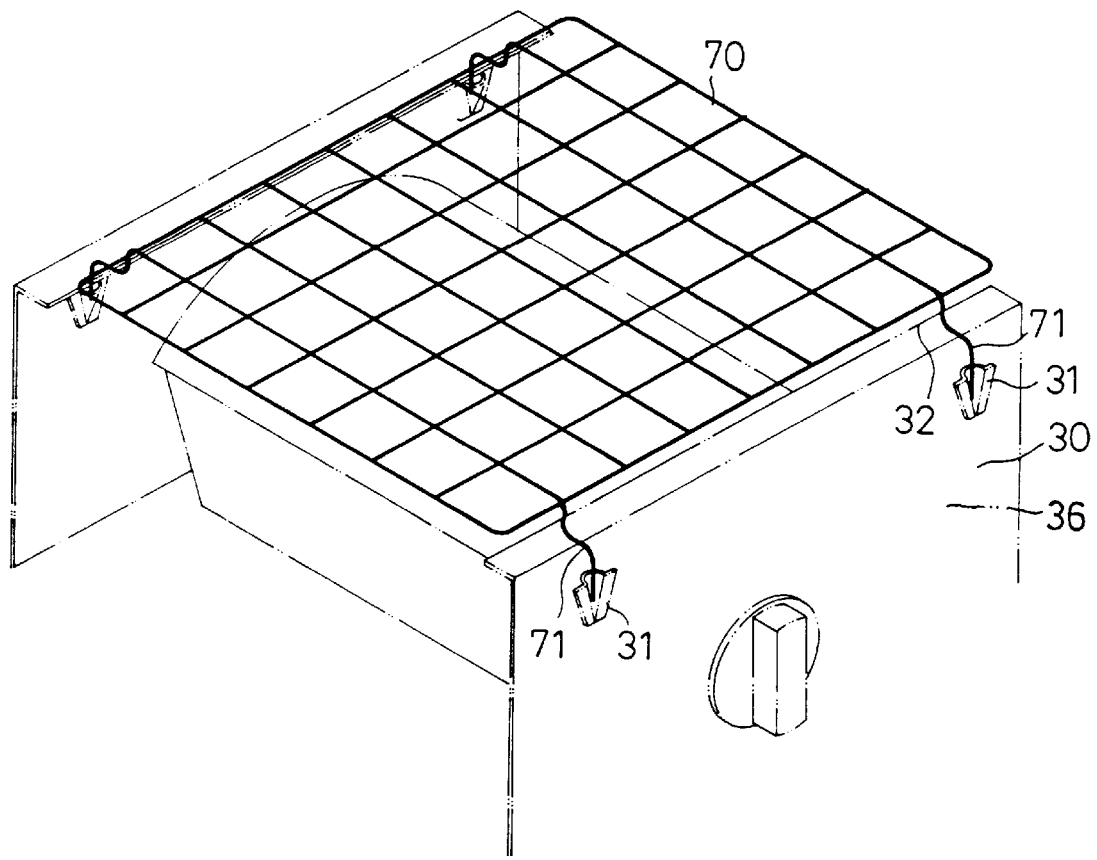
FIG. 5 is a partial perspective view illustrating the engagement of a grill on the barbecue device.
Figure 6:
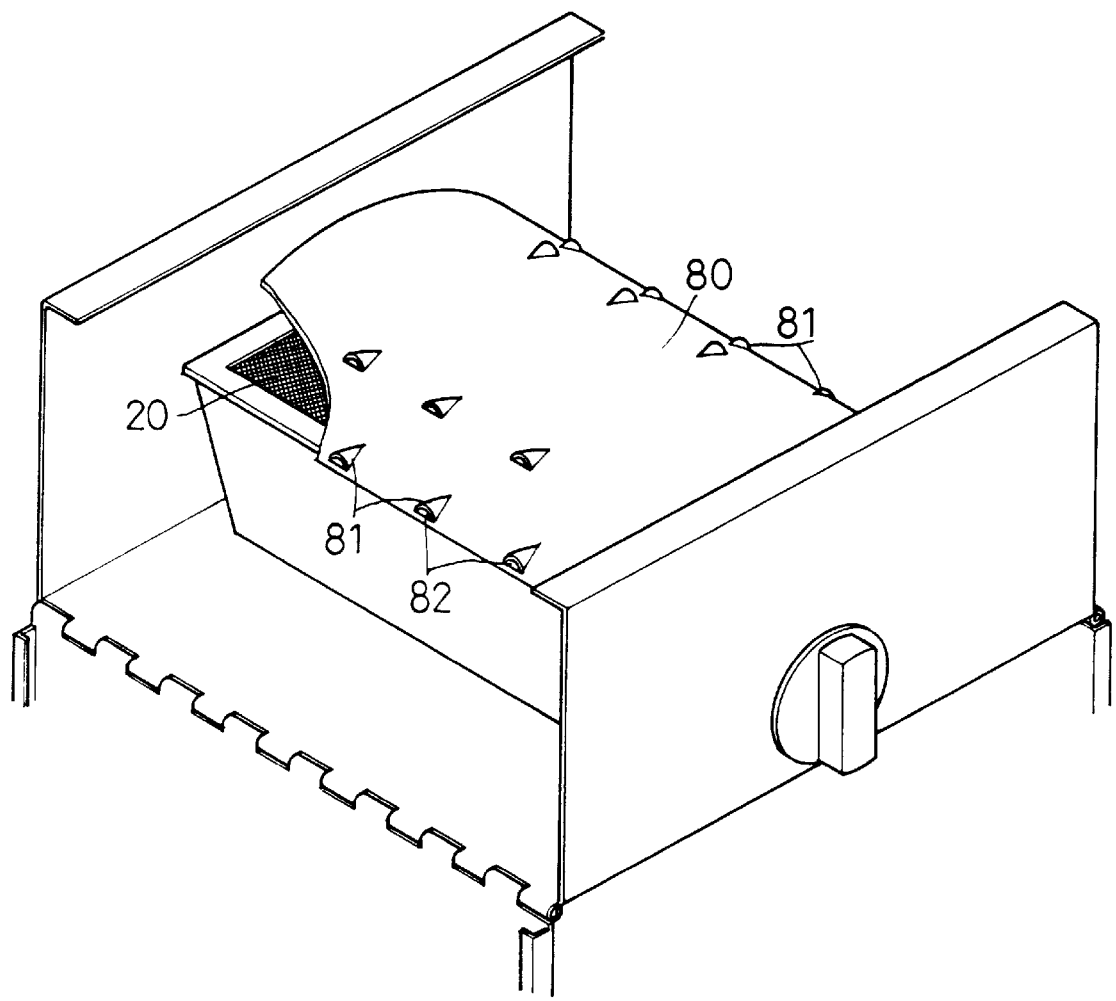
FIG. 6 is a partial perspective view illustrating the configuration of the gas stove of the barbecue device.

Referring next to FIG. 5, the housing 30 includes three or more brackets 31 secured in the front and the rear panels 36 respectively, and a grill 70 having three or more extensions 71 extended downward for engaging with the brackets 31 and for supporting in the upper portion of the housing 30. The extensions 71 each /

I claim:

1. A barbecue device comprising:
   a housing including two side portions and including a chamber formed therein, and
   a pair of covers each pivotally secured to a respective side portion of said housing at a pivot shaft for allowing said covers to be folded between a folded position and an open position, said covers each including a leg for enclosing said side portions of said housing when said covers are folded to said folded position, said legs of said covers being folded and depend downward from said housing for elevating said housing when said covers are rotated to said open position, said covers each including a base for supporting said legs at said open positions
   a first of said covers including at least one retainer, and said housing including a bottle secured to said at least one retainer.

2. The barbecue device according to claim 1 further comprising a stove received in said chamber of said housing.

3. The barbecue device according to claim 1, wherein said bottle is a gas bottle.

4. The barbecue device according to claim 1, wherein said bottle is a bottle for receiving seasonings.

5. A barbecue device comprising:

a housing including two side portions and including a chamber formed therein, and a pair of covers each pivotally secured to a respective side portion of said housing at a pivot shaft for allowing said covers to be folded between a folded position and an open position, said covers each including a leg for enclosing said side portions of said housing when said covers are folded to said folded position, said legs of said covers being folded and depend downward from said housing for elevating said housing when said covers are rotated to said open position, said covers each including a base for supporting said legs at said open position, said housing including a front panel and a rear panel and including at least three brackets secured to said front panel and said rear panel, said barbecue device further including a grill having at least three extensions extended downward for engaging with said at least three brackets and for being secured to said housing.

6. The barbecue device according to claim 2 further comprising a protective cap supported on top of said stove.

7. A barbecue device comprising:

a housing including two side portions and including a chamber formed therein, a pair of covers each pivotally secured to a respective said side portion of said housing at a pivot shaft for allowing said covers to be folded between a folded position and an open position, said covers each including a leg for enclosing said side portions of said housing when said covers are folded to said folded position, said legs of said covers being folded and depend downward from said housing for elevating said housing when said covers are rotated to said open position, said covers each including a base for supporting said legs at said open position, a stove received in said chamber of said housing, and a protective cap supported on top of said stove, said protective cap being upwardly curved and including a plurality of bulges formed thereon for defining a plurality of openings.

* * * * *